US007620097B2

(12) United States Patent
Heidari et al.

(10) Patent No.: US 7,620,097 B2
(45) Date of Patent: *Nov. 17, 2009

(54) COMMUNICATIONS MODULE, DEVICE, AND METHOD FOR IMPLEMENTING A SYSTEM ACQUISITION FUNCTION

(75) Inventors: Ghobad Heidari, San Diego, CA (US); Kuor-Hsin Chang, Sunnyvale, CA (US); Paul L. Master, Sunnyvale, CA (US); Eugene B. Hogenauer, San Carlos, CA (US); Walter James Scheuermann, Saratoga, CA (US)

(73) Assignee: QST Holdings, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/343,333

(22) Filed: Dec. 23, 2008

(65) Prior Publication Data
US 2009/0103594 A1  Apr. 23, 2009

Related U.S. Application Data

(63) Continuation of application No. 12/141,822, filed on Jun. 18, 2008, which is a continuation of application No. 10/067,496, filed on Feb. 4, 2002, now Pat. No. 7,400,668, which is a continuation-in-part of application No. 09/815,122, filed on Mar. 22, 2001, now Pat. No. 6,836,839.

(51) Int. Cl.
*H04B 1/707* (2006.01)
(52) U.S. Cl. ........................ 375/148; 375/150
(58) Field of Classification Search ......... 375/142–145, 375/148–150, 152, 343; 370/320, 335, 342, 370/441
See application file for complete search history.

(56) References Cited

U.S. PATENT DOCUMENTS 3,409,175 A  11/1968  Byrne (Continued)

FOREIGN PATENT DOCUMENTS

DE  100 18 374 A1  10/2001

(Continued)

OTHER PUBLICATIONS

Abnous et al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470 (Oct. 30, 1998).

(Continued)

*Primary Examiner*—Don N Vo
(74) *Attorney, Agent, or Firm*—Marc S. Kaufman; Nixon Peabody LLP

(57) ABSTRACT

A communications module, device and corresponding method for facilitating PN code searching. The module and device have a PN sequence generator configurable to generate a plurality of PN sequences. The module and device also include computational units configurable to correlate received signal samples of a plurality of received signal samples with a corresponding PN sequence of the plurality of PN sequences, and further configurable to provide other hardware resources. A number of computational units from the plurality of computational units are selectively configured to correlate the received signal samples with the PN sequences—the number depending upon availability of the plurality of computational units from providing the other hardware resources. According to a preferred embodiment, a plurality of configurable computational units are selectively configurable to implement the PN sequence generator.

38 Claims, 6 Drawing Sheets

U.S. PATENT DOCUMENTS

| | | |
|---|---|---|
| 3,665,171 A | 5/1972 | Morrow |
| 3,666,143 A | 5/1972 | Weston |
| 3,938,639 A | 2/1976 | Birrell |
| 3,949,903 A | 4/1976 | Benasutti et al. |
| 3,960,298 A | 6/1976 | Birrell |
| 3,967,062 A | 6/1976 | Dobias |
| 3,991,911 A | 11/1976 | Shannon et al. |
| 3,995,441 A | 12/1976 | McMillin |
| 4,076,145 A | 2/1978 | Zygiel |
| 4,143,793 A | 3/1979 | McMillin et al. |
| 4,172,669 A | 10/1979 | Edelbach |
| 4,174,872 A | 11/1979 | Fessler |
| 4,181,242 A | 1/1980 | Zygiel et al. |
| RE30,301 E | 6/1980 | Zygiel |
| 4,218,014 A | 8/1980 | Tracy |
| 4,222,972 A | 9/1980 | Caldwell |
| 4,237,536 A | 12/1980 | Enelow et al. |
| 4,252,253 A | 2/1981 | Shannon |
| 4,302,775 A | 11/1981 | Widergren et al. |
| 4,333,587 A | 6/1982 | Fessler et al. |
| 4,354,613 A | 10/1982 | Desai et al. |
| 4,377,246 A | 3/1983 | McMillin et al. |
| 4,380,046 A | 4/1983 | Fung et al. |
| 4,393,468 A | 7/1983 | New |
| 4,413,752 A | 11/1983 | McMillin et al. |
| 4,458,584 A | 7/1984 | Annese et al. |
| 4,466,342 A | 8/1984 | Basile et al. |
| 4,475,448 A | 10/1984 | Shoaf et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,577,782 A | 3/1986 | Fessler |
| 4,578,799 A | 3/1986 | Scholl et al. |
| RE32,179 E | 6/1986 | Sedam et al. |
| 4,633,386 A | 12/1986 | Terepin et al. |
| 4,658,988 A | 4/1987 | Hassell |
| 4,694,416 A | 9/1987 | Wheeler et al. |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,758,985 A | 7/1988 | Carter |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,870,302 A | 9/1989 | Freeman |
| 4,901,887 A | 2/1990 | Burton |
| 4,905,231 A | 2/1990 | Leung et al. |
| 4,921,315 A | 5/1990 | Metcalfe et al. |
| 4,930,666 A | 6/1990 | Rudick |
| 4,932,564 A | 6/1990 | Austin et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,099,418 A | 3/1992 | Pian et al. |
| 5,129,549 A | 7/1992 | Austin |
| 5,139,708 A | 8/1992 | Scott |
| 5,144,166 A | 9/1992 | Camarota et al. |
| 5,156,301 A | 10/1992 | Hassell et al. |
| 5,156,871 A | 10/1992 | Goulet et al. |
| 5,165,023 A | 11/1992 | Gifford |
| 5,165,575 A | 11/1992 | Scott |
| 5,177,700 A | 1/1993 | Göckler |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,218,240 A | 6/1993 | Camarota et al. |
| 5,240,144 A | 8/1993 | Feldman |
| 5,245,227 A | 9/1993 | Furtek et al. |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,335,276 A | 8/1994 | Thompson et al. |
| 5,336,950 A | 8/1994 | Popli et al. |
| 5,339,428 A | 8/1994 | Burmeister et al. |
| 5,343,716 A | 9/1994 | Swanson et al. |
| 5,361,362 A | 11/1994 | Benkeser et al. |
| 5,367,651 A | 11/1994 | Smith et al. |
| 5,367,687 A | 11/1994 | Tarsy et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,062 A | 2/1995 | Knutson |
| 5,388,212 A | 2/1995 | Grube et al. |
| 5,392,960 A | 2/1995 | Kendt et al. |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,475,856 A | 12/1995 | Kogge |
| 5,479,055 A | 12/1995 | Eccles |
| 5,490,165 A | 2/1996 | Blakeney, II et al. |
| 5,491,823 A | 2/1996 | Ruttenberg |
| 5,504,891 A | 4/1996 | Motoyama et al. |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A | 11/1996 | Kawan et al. |
| 5,590,353 A | 12/1996 | Sakakibara et al. |
| 5,594,657 A | 1/1997 | Cantone et al. |
| 5,600,810 A | 2/1997 | Ohkami |
| 5,600,844 A | 2/1997 | Shaw et al. |
| 5,602,833 A | 2/1997 | Zehavi |
| 5,603,043 A | 2/1997 | Taylor et al. |

| | | | | | |
|---|---|---|---|---|---|
| 5,607,083 A | 3/1997 | Vogel et al. | 5,892,950 A | 4/1999 | Rigori et al. |
| 5,608,643 A | 3/1997 | Wichter et al. | 5,892,961 A | 4/1999 | Trimberger |
| 5,611,867 A | 3/1997 | Cooper et al. | 5,892,962 A | 4/1999 | Cloutier |
| 5,623,545 A | 4/1997 | Childs et al. | 5,894,473 A | 4/1999 | Dent |
| 5,625,669 A | 4/1997 | McGregor et al. | 5,901,884 A | 5/1999 | Goulet et al. |
| 5,626,407 A | 5/1997 | Westcott | 5,903,886 A | 5/1999 | Heimlich et al. |
| 5,630,206 A | 5/1997 | Urban et al. | 5,907,285 A | 5/1999 | Toms et al. |
| 5,635,940 A | 6/1997 | Hickman et al. | 5,907,580 A | 5/1999 | Cummings |
| 5,646,544 A | 7/1997 | Iadanza | 5,910,733 A | 6/1999 | Bertolet et al. |
| 5,646,545 A | 7/1997 | Trimberger et al. | 5,912,572 A | 6/1999 | Graf, III |
| 5,647,512 A | 7/1997 | Assis Mascarenhas deOliveira et al. | 5,913,172 A | 6/1999 | McCabe et al. |
| | | | 5,917,852 A | 6/1999 | Butterfield et al. |
| 5,667,110 A | 9/1997 | McCann et al. | 5,920,801 A | 7/1999 | Thomas et al. |
| 5,684,793 A | 11/1997 | Kiema et al. | 5,931,918 A | 8/1999 | Row et al. |
| 5,684,980 A | 11/1997 | Casselman | 5,933,642 A | 8/1999 | Greenbaum et al. |
| 5,687,236 A | 11/1997 | Moskowitz et al. | 5,940,438 A | 8/1999 | Poon et al. |
| 5,694,613 A | 12/1997 | Suzuki | 5,949,415 A | 9/1999 | Lin et al. |
| 5,694,794 A | 12/1997 | Jerg et al. | 5,950,011 A | 9/1999 | Albrecht et al. |
| 5,699,328 A | 12/1997 | Ishizaki et al. | 5,950,131 A | 9/1999 | Vilmur |
| 5,701,398 A | 12/1997 | Glier et al. | 5,951,674 A | 9/1999 | Moreno |
| 5,701,482 A | 12/1997 | Harrison et al. | 5,953,322 A | 9/1999 | Kimball |
| 5,704,053 A | 12/1997 | Santhanam | 5,956,518 A | 9/1999 | DeHon et al. |
| 5,706,191 A | 1/1998 | Bassett et al. | 5,956,967 A | 9/1999 | Kim |
| 5,706,976 A | 1/1998 | Purkey | 5,959,811 A | 9/1999 | Richardson |
| 5,712,996 A | 1/1998 | Schepers | 5,959,881 A | 9/1999 | Trimberger et al. |
| 5,720,002 A | 2/1998 | Wang | 5,963,048 A | 10/1999 | Harrison et al. |
| 5,721,693 A | 2/1998 | Song | 5,966,534 A | 10/1999 | Cooke et al. |
| 5,721,854 A | 2/1998 | Ebicioglu et al. | 5,970,254 A | 10/1999 | Cooke et al. |
| 5,729,754 A | 3/1998 | Estes | 5,987,105 A | 11/1999 | Jenkins et al. |
| 5,732,563 A | 3/1998 | Bethuy et al. | 5,987,611 A | 11/1999 | Freund |
| 5,734,808 A | 3/1998 | Takeda | 5,991,302 A | 11/1999 | Berl et al. |
| 5,737,631 A | 4/1998 | Trimberger | 5,991,308 A | 11/1999 | Fuhrmann et al. |
| 5,742,180 A | 4/1998 | DeHon et al. | 5,993,739 A | 11/1999 | Lyon |
| 5,742,821 A | 4/1998 | Prasanna | 5,999,734 A | 12/1999 | Willis et al. |
| 5,745,366 A | 4/1998 | Higham et al. | 6,005,943 A | 12/1999 | Cohen et al. |
| RE35,780 E | 5/1998 | Hassell et al. | 6,006,249 A | 12/1999 | Leong |
| 5,751,295 A | 5/1998 | Becklund et al. | 6,016,395 A | 1/2000 | Mohamed |
| 5,754,227 A | 5/1998 | Fukuoka | 6,021,186 A | 2/2000 | Suzuki et al. |
| 5,758,261 A | 5/1998 | Wiedeman | 6,021,492 A | 2/2000 | May |
| 5,768,561 A | 6/1998 | Wise | 6,023,742 A | 2/2000 | Ebeling et al. |
| 5,778,439 A | 7/1998 | Trimberger et al. | 6,023,755 A | 2/2000 | Casselman |
| 5,784,636 A | 7/1998 | Rupp | 6,028,610 A | 2/2000 | Deering |
| 5,787,237 A | 7/1998 | Reilly | 6,036,166 A | 3/2000 | Olson |
| 5,790,817 A | 8/1998 | Asghar et al. | 6,039,219 A | 3/2000 | Bach et al. |
| 5,791,517 A | 8/1998 | Avital | 6,041,322 A | 3/2000 | Meng et al. |
| 5,791,523 A | 8/1998 | Oh | 6,041,970 A | 3/2000 | Vogel |
| 5,794,062 A | 8/1998 | Baxter | 6,046,603 A | 4/2000 | New |
| 5,794,067 A | 8/1998 | Kadowaki | 6,047,115 A | 4/2000 | Mohan et al. |
| 5,802,055 A | 9/1998 | Krein et al. | 6,052,600 A | 4/2000 | Fette et al. |
| 5,812,851 A | 9/1998 | Levy et al. | 6,055,314 A | 4/2000 | Spies et al. |
| 5,818,603 A | 10/1998 | Motoyama | 6,056,194 A | 5/2000 | Kolls |
| 5,819,255 A | 10/1998 | Celis et al. | 6,059,840 A | 5/2000 | Click, Jr. |
| 5,822,308 A | 10/1998 | Weigand et al. | 6,061,580 A | 5/2000 | Altschul et al. |
| 5,822,313 A | 10/1998 | Malek et al. | 6,073,132 A | 6/2000 | Gehman |
| 5,822,360 A | 10/1998 | Lee et al. | 6,076,174 A | 6/2000 | Freund |
| 5,828,858 A | 10/1998 | Athanas et al. | 6,078,736 A | 6/2000 | Guccione |
| 5,829,085 A | 11/1998 | Jerg et al. | 6,085,740 A | 7/2000 | Ivri et al. |
| 5,835,753 A | 11/1998 | Witt | 6,088,043 A | 7/2000 | Kelleher et al. |
| 5,838,165 A | 11/1998 | Chatter | 6,091,263 A | 7/2000 | New et al. |
| 5,845,815 A | 12/1998 | Vogel | 6,091,765 A | 7/2000 | Pietzold, III et al. |
| 5,854,929 A | 12/1998 | Van Pract et al. | 6,094,065 A | 7/2000 | Tavana et al. |
| 5,860,021 A | 1/1999 | Klingman | 6,094,726 A | 7/2000 | Gonion et al. |
| 5,862,961 A | 1/1999 | Motta et al. | 6,111,893 A | 8/2000 | Volftsun et al. |
| 5,870,427 A | 2/1999 | Tiedemann, Jr. et al. | 6,111,935 A | 8/2000 | Hughes-Hartogs |
| 5,873,045 A | 2/1999 | Lee et al. | 6,112,218 A | 8/2000 | Gandhi et al. |
| 5,881,106 A | 3/1999 | Cartier | 6,115,751 A | 9/2000 | Tam et al. |
| 5,884,284 A | 3/1999 | Peters et al. | 6,119,178 A | 9/2000 | Martin et al. |
| 5,886,537 A | 3/1999 | Macias et al. | 6,120,551 A | 9/2000 | Law et al. |
| 5,887,174 A | 3/1999 | Simons et al. | 6,122,670 A | 9/2000 | Bennett et al. |
| 5,889,816 A | 3/1999 | Agrawal et al. | 6,128,307 A | 10/2000 | Brown |
| 5,889,989 A | 3/1999 | Robertazzi et al. | 6,134,605 A | 10/2000 | Hudson et al. |
| 5,890,014 A | 3/1999 | Long | 6,138,693 A | 10/2000 | Matz |
| 5,892,900 A | 4/1999 | Ginter et al. | 6,141,283 A | 10/2000 | Bogin et al. |

| | | | | | | |
|---|---|---|---|---|---|---|
| 6,150,838 | A | 11/2000 | Wittig et al. | 6,430,624 | B1 | 8/2002 | Jamtgaard et al. |
| 6,154,494 | A | 11/2000 | Sugahara et al. | 6,433,578 | B1 | 8/2002 | Wasson |
| 6,157,997 | A | 12/2000 | Oowaki et al. | 6,434,590 | B1 | 8/2002 | Blelloch et al. |
| 6,158,031 | A | 12/2000 | Mack et al. | 6,438,737 | B1 | 8/2002 | Morelli et al. |
| 6,173,389 | B1 | 1/2001 | Pechanek et al. | 6,446,258 | B1 | 9/2002 | McKinsey et al. |
| 6,175,854 | B1 | 1/2001 | Bretscher | 6,449,747 | B2 | 9/2002 | Wuytack et al. |
| 6,175,892 | B1 | 1/2001 | Sazzad et al. | 6,456,996 | B1 | 9/2002 | Crawford, Jr. et al. |
| 6,181,981 | B1 | 1/2001 | Varga et al. | 6,459,883 | B2 | 10/2002 | Subramanian et al. |
| 6,185,418 | B1 | 2/2001 | MacLellan et al. | 6,467,009 | B1 | 10/2002 | Winegarden et al. |
| 6,192,070 | B1 | 2/2001 | Poon et al. | 6,469,540 | B2 | 10/2002 | Nakaya |
| 6,192,255 | B1 | 2/2001 | Lewis et al. | 6,473,609 | B1 | 10/2002 | Schwartz et al. |
| 6,192,388 | B1 | 2/2001 | Cajolet | 6,483,343 | B1 | 11/2002 | Faith et al. |
| 6,195,788 | B1 | 2/2001 | Leaver et al. | 6,507,947 | B1 | 1/2003 | Schreiber et al. |
| 6,198,924 | B1 | 3/2001 | Ishii et al. | 6,510,138 | B1 | 1/2003 | Pannell |
| 6,199,181 | B1 | 3/2001 | Rechef et al. | 6,510,510 | B1 | 1/2003 | Garde |
| 6,202,130 | B1 | 3/2001 | Scales, III et al. | 6,526,570 | B1 | 2/2003 | Click, Jr. et al. |
| 6,202,189 | B1 | 3/2001 | Hinedi et al. | 6,538,470 | B1 | 3/2003 | Langhammer et al. |
| 6,219,697 | B1 | 4/2001 | Lawande et al. | 6,556,044 | B2 | 4/2003 | Langhammer et al. |
| 6,219,756 | B1 | 4/2001 | Kasamizugami | 6,563,891 | B1 | 5/2003 | Eriksson et al. |
| 6,219,780 | B1 | 4/2001 | Lipasti | 6,570,877 | B1 | 5/2003 | Kloth et al. |
| 6,223,222 | B1 | 4/2001 | Fijolek et al. | 6,577,678 | B2 | 6/2003 | Scheuermann |
| 6,226,387 | B1 | 5/2001 | Tewfik et al. | 6,587,684 | B1 | 7/2003 | Hsu et al. |
| 6,230,307 | B1 | 5/2001 | Davis et al. | 6,590,415 | B2 | 7/2003 | Agrawal et al. |
| 6,237,029 | B1 | 5/2001 | Master et al. | 6,601,086 | B1 | 7/2003 | Howard et al. |
| 6,246,883 | B1 | 6/2001 | Lee | 6,601,158 | B1 | 7/2003 | Abbott et al. |
| 6,247,125 | B1 | 6/2001 | Noel-Baron et al. | 6,604,085 | B1 | 8/2003 | Kolls |
| 6,249,251 | B1 | 6/2001 | Chang et al. | 6,604,189 | B1 | 8/2003 | Zemlyak et al. |
| 6,258,725 | B1 | 7/2001 | Lee et al. | 6,606,529 | B1 | 8/2003 | Crowder, Jr. et al. |
| 6,259,725 | B1 | 7/2001 | Schilling | 6,615,333 | B1 | 9/2003 | Hoogerbrugge et al. |
| 6,263,057 | B1 | 7/2001 | Silverman | 6,618,434 | B2 | 9/2003 | Heidari-Bateni et al. |
| 6,266,760 | B1 | 7/2001 | DeHon et al. | 6,640,304 | B2 | 10/2003 | Ginter et al. |
| 6,269,075 | B1 * | 7/2001 | Tran ......................... 370/206 | 6,647,429 | B1 | 11/2003 | Semal |
| 6,272,579 | B1 | 8/2001 | Lentz et al. | 6,653,859 | B2 | 11/2003 | Sihlbom et al. |
| 6,272,616 | B1 | 8/2001 | Fernando et al. | 6,675,265 | B2 | 1/2004 | Barroso et al. |
| 6,279,020 | B1 | 8/2001 | Dujardin et al. | 6,675,284 | B1 | 1/2004 | Warren |
| 6,281,703 | B1 | 8/2001 | Furuta et al. | 6,691,148 | B1 | 2/2004 | Zinky et al. |
| 6,282,627 | B1 | 8/2001 | Wong et al. | 6,694,380 | B1 | 2/2004 | Wolrich et al. |
| 6,286,134 | B1 | 9/2001 | Click, Jr. et al. | 6,711,617 | B1 | 3/2004 | Bantz et al. |
| 6,289,375 | B1 | 9/2001 | Knight et al. | 6,718,182 | B1 | 4/2004 | Kung |
| 6,289,434 | B1 | 9/2001 | Roy | 6,718,541 | B2 | 4/2004 | Ostanevich et al. |
| 6,289,488 | B1 | 9/2001 | Dave et al. | 6,721,286 | B1 | 4/2004 | Williams et al. |
| 6,292,822 | B1 | 9/2001 | Hardwick | 6,721,884 | B1 | 4/2004 | De Oliveira Kastrup Pereira et al. |
| 6,292,827 | B1 | 9/2001 | Raz | 6,732,354 | B2 | 5/2004 | Ebeling et al. |
| 6,292,830 | B1 | 9/2001 | Taylor et al. | 6,735,621 | B1 | 5/2004 | Yoakum et al. |
| 6,292,938 | B1 | 9/2001 | Sarkar et al. | 6,738,744 | B2 | 5/2004 | Kirovski et al. |
| 6,301,653 | B1 | 10/2001 | Mohamed et al. | 6,748,360 | B2 | 6/2004 | Pitman et al. |
| 6,305,014 | B1 | 10/2001 | Roediger et al. | 6,751,723 | B1 | 6/2004 | Kundu et al. |
| 6,311,149 | B1 | 10/2001 | Ryan et al. | 6,754,470 | B2 | 6/2004 | Hendrickson et al. |
| 6,321,985 | B1 | 11/2001 | Kolls | 6,760,587 | B2 | 7/2004 | Holtzman et al. |
| 6,326,806 | B1 | 12/2001 | Fallside et al. | 6,760,833 | B1 | 7/2004 | Dowling |
| 6,346,824 | B1 | 2/2002 | New | 6,766,165 | B2 | 7/2004 | Sharma et al. |
| 6,347,346 | B1 | 2/2002 | Taylor | 6,778,212 | B1 | 8/2004 | Deng et al. |
| 6,349,394 | B1 | 2/2002 | Brock et al. | 6,785,341 | B2 | 8/2004 | Walton et al. |
| 6,353,841 | B1 | 3/2002 | Marshall et al. | 6,819,140 | B2 | 11/2004 | Yamanaka et al. |
| 6,356,994 | B1 | 3/2002 | Barry et al. | 6,823,448 | B2 | 11/2004 | Roth et al. |
| 6,359,248 | B1 | 3/2002 | Mardi | 6,829,633 | B2 | 12/2004 | Gelfer et al. |
| 6,360,256 | B1 | 3/2002 | Lim | 6,832,250 | B1 | 12/2004 | Coons et al. |
| 6,360,259 | B1 | 3/2002 | Bradley | 6,836,839 | B2 | 12/2004 | Master et al. |
| 6,360,263 | B1 | 3/2002 | Kurtzberg et al. | 6,854,002 | B2 | 2/2005 | Conway et al. |
| 6,363,411 | B1 | 3/2002 | Dugan et al. | 6,859,434 | B2 | 2/2005 | Segal et al. |
| 6,366,999 | B1 | 4/2002 | Drabenstott et al. | 6,865,664 | B2 | 3/2005 | Budrovic et al. |
| 6,377,983 | B1 | 4/2002 | Cohen et al. | 6,871,236 | B2 | 3/2005 | Fishman et al. |
| 6,378,072 | B1 | 4/2002 | Collins et al. | 6,883,084 | B1 | 4/2005 | Donohoe |
| 6,381,293 | B1 | 4/2002 | Lee et al. | 6,894,996 | B2 | 5/2005 | Lee |
| 6,381,735 | B1 | 4/2002 | Hunt | 6,901,440 | B1 | 5/2005 | Bimm et al. |
| 6,385,751 | B1 | 5/2002 | Wolf | 6,912,515 | B2 | 6/2005 | Jackson et al. |
| 6,405,214 | B1 | 6/2002 | Meade, II | 6,941,336 | B1 | 9/2005 | Mar |
| 6,408,039 | B1 | 6/2002 | Ito | 6,980,515 | B1 | 12/2005 | Schunk et al. |
| 6,410,941 | B1 | 6/2002 | Taylor et al. | 6,985,517 | B2 | 1/2006 | Matsumoto et al. |
| 6,411,612 | B1 | 6/2002 | Halford et al. | 6,986,021 | B2 | 1/2006 | Master et al. |
| 6,421,372 | B1 | 7/2002 | Bierly et al. | 6,986,142 | B1 | 1/2006 | Ehlig et al. |
| 6,421,809 | B1 | 7/2002 | Wuytack et al. | 6,988,139 | B1 | 1/2006 | Jervis et al. |
| 6,426,649 | B1 | 7/2002 | Fu et al. | 7,032,229 | B1 | 4/2006 | Flores et al. |

| | | | | | | |
|---|---|---|---|---|---|---|
| 7,044,741 B2 | 5/2006 | Leem | | 2003/0110485 A1 | 6/2003 | Lu et al. |
| 7,082,456 B2 | 7/2006 | Mani-Meitav et al. | | 2003/0142818 A1 | 7/2003 | Raghunathan et al. |
| 7,139,910 B1 | 11/2006 | Ainsworth et al. | | 2003/0154357 A1 | 8/2003 | Master et al. |
| 7,142,731 B1 | 11/2006 | Toi | | 2003/0163723 A1 | 8/2003 | Kozuch et al. |
| 7,249,242 B2 | 7/2007 | Ramchandran | | 2003/0172138 A1 | 9/2003 | McCormack et al. |
| 7,400,668 B2 * | 7/2008 | Heidari et al. ............... 375/148 | | 2003/0172139 A1 | 9/2003 | Srinivasan et al. |
| 2001/0003191 A1 | 6/2001 | Kovacs et al. | | 2003/0200538 A1 | 10/2003 | Ebeling et al. |
| 2001/0023482 A1 | 9/2001 | Wray | | 2003/0212684 A1 | 11/2003 | Meyer et al. |
| 2001/0029515 A1 | 10/2001 | Mirsky | | 2003/0229864 A1 | 12/2003 | Watkins |
| 2001/0034227 A1 * | 10/2001 | Subramanian et al. ...... 455/419 | | 2004/0006584 A1 | 1/2004 | Vandeweerd |
| 2001/0034795 A1 | 10/2001 | Moulton et al. | | 2004/0010645 A1 | 1/2004 | Scheuermann et al. |
| 2001/0039654 A1 | 11/2001 | Miyamoto | | 2004/0015970 A1 | 1/2004 | Scheuermann |
| 2001/0048713 A1 | 12/2001 | Medlock et al. | | 2004/0025159 A1 | 2/2004 | Scheuermann et al. |
| 2001/0048714 A1 | 12/2001 | Jha | | 2004/0057505 A1 | 3/2004 | Valio |
| 2001/0050948 A1 | 12/2001 | Ramberg et al. | | 2004/0062300 A1 | 4/2004 | McDonough et al. |
| 2002/0010848 A1 | 1/2002 | Kamano et al. | | 2004/0081248 A1 | 4/2004 | Parolari |
| 2002/0013799 A1 | 1/2002 | Blaker | | 2004/0086027 A1 | 5/2004 | Shattil |
| 2002/0013937 A1 | 1/2002 | Ostanevich et al. | | 2004/0093479 A1 | 5/2004 | Ramchandran |
| 2002/0015435 A1 | 2/2002 | Rieken | | 2004/0168044 A1 | 8/2004 | Ramchandran |
| 2002/0015439 A1 | 2/2002 | Kohli et al. | | 2004/0174932 A1 | 9/2004 | Warke et al. |
| 2002/0023210 A1 | 2/2002 | Tuomenoksa et al. | | 2005/0044344 A1 | 2/2005 | Stevens |
| 2002/0024942 A1 | 2/2002 | Tsuneki et al. | | 2005/0166038 A1 | 7/2005 | Wang et al. |
| 2002/0024993 A1 | 2/2002 | Subramanian et al. | | 2005/0190871 A1 | 9/2005 | Sedarat |
| 2002/0031166 A1 | 3/2002 | Subramanian et al. | | 2005/0198199 A1 | 9/2005 | Dowling |
| 2002/0032551 A1 | 3/2002 | Zakiya | | 2006/0031660 A1 | 2/2006 | Master et al. |
| 2002/0035623 A1 | 3/2002 | Lawande et al. | | 2006/0056496 A1 * | 3/2006 | Smee et al. ................. 375/148 |
| 2002/0041581 A1 | 4/2002 | Aramaki | | | | |
| 2002/0042875 A1 | 4/2002 | Shukla | | | FOREIGN PATENT DOCUMENTS | |
| 2002/0042907 A1 | 4/2002 | Yamanaka et al. | | EP | 0 301 169 A1 | 2/1989 |
| 2002/0061741 A1 | 5/2002 | Leung et al. | | EP | 0 166 586 B1 | 1/1991 |
| 2002/0069282 A1 | 6/2002 | Reisman | | EP | 0 236 633 B1 | 5/1991 |
| 2002/0072830 A1 | 6/2002 | Hunt | | EP | 0 478 624 B1 | 4/1992 |
| 2002/0078337 A1 | 6/2002 | Moreau et al. | | EP | 0 479 102 A2 | 4/1992 |
| 2002/0083305 A1 | 6/2002 | Renard et al. | | EP | 0 661 831 A2 | 7/1995 |
| 2002/0083423 A1 | 6/2002 | Ostanevich et al. | | EP | 0 668 659 A2 | 8/1995 |
| 2002/0087829 A1 | 7/2002 | Snyder et al. | | EP | 0 690 588 A2 | 1/1996 |
| 2002/0089348 A1 | 7/2002 | Langhammer | | EP | 0 691 754 A2 | 1/1996 |
| 2002/0101909 A1 | 8/2002 | Chen et al. | | EP | 0 768 602 A2 | 4/1997 |
| 2002/0107905 A1 | 8/2002 | Roe et al. | | EP | 0 817 003 A2 | 1/1998 |
| 2002/0107962 A1 | 8/2002 | Richter et al. | | EP | 0 821 495 A2 | 1/1998 |
| 2002/0119803 A1 | 8/2002 | Bitterlich et al. | | EP | 0 866 210 A2 | 9/1998 |
| 2002/0120672 A1 | 8/2002 | Butt et al. | | EP | 0 923 247 A2 | 6/1999 |
| 2002/0133688 A1 | 9/2002 | Lee et al. | | EP | 0 926 596 A2 | 6/1999 |
| 2002/0138716 A1 | 9/2002 | Master et al. | | EP | 1 056 217 A2 | 11/2000 |
| 2002/0141489 A1 | 10/2002 | Imaizumi | | EP | 1 061 437 A1 | 12/2000 |
| 2002/0147845 A1 | 10/2002 | Sanchez-Herrero et al. | | EP | 1 061 443 A2 | 12/2000 |
| 2002/0159503 A1 | 10/2002 | Ramachandran | | EP | 1 126 368 A2 | 8/2001 |
| 2002/0162026 A1 | 10/2002 | Neuman et al. | | EP | 1 150 506 A2 | 10/2001 |
| 2002/0167997 A1 | 11/2002 | Kim et al. | | EP | 1 189 358 A1 | 3/2002 |
| 2002/0168018 A1 | 11/2002 | Scheuermann | | GB | 2 067 800 A | 7/1981 |
| 2002/0181559 A1 | 12/2002 | Heidari-Bateni et al. | | GB | 2 237 908 A | 5/1991 |
| 2002/0184275 A1 | 12/2002 | Dutta et al. | | JP | 62-249456 | 10/1987 |
| 2002/0184291 A1 | 12/2002 | Hogenauer | | JP | 63-147258 | 6/1988 |
| 2002/0184498 A1 | 12/2002 | Qi | | JP | 4-51546 | 2/1992 |
| 2002/0191790 A1 | 12/2002 | Anand et al. | | JP | 7-064789 | 3/1995 |
| 2003/0007606 A1 | 1/2003 | Suder et al. | | JP | 7066718 | 3/1995 |
| 2003/0012270 A1 | 1/2003 | Zhou et al. | | JP | 10233676 | 9/1998 |
| 2003/0018446 A1 | 1/2003 | Makowski et al. | | JP | 10254696 | 9/1998 |
| 2003/0018700 A1 | 1/2003 | Giroti et al. | | JP | 11296345 | 10/1999 |
| 2003/0023649 A1 | 1/2003 | Kamiya et al. | | JP | 2000315731 | 11/2000 |
| 2003/0023830 A1 | 1/2003 | Hogenauer | | JP | 2001-053703 | 2/2001 |
| 2003/0026242 A1 | 2/2003 | Jokinen et al. | | WO | WO 89/05029 A1 | 6/1989 |
| 2003/0030004 A1 | 2/2003 | Dixon et al. | | WO | WO 89/11443 A2 | 11/1989 |
| 2003/0046421 A1 | 3/2003 | Horvitz et al. | | WO | WO 91/00238 A1 | 1/1991 |
| 2003/0050055 A1 * | 3/2003 | Ting et al. ................... 455/419 | | WO | WO 93/13603 A1 | 7/1993 |
| 2003/0061260 A1 | 3/2003 | Rajkumar | | WO | WO 95/11855 A1 | 5/1995 |
| 2003/0061311 A1 | 3/2003 | Lo | | WO | WO 96/33558 A1 | 10/1996 |
| 2003/0063656 A1 | 4/2003 | Rao et al. | | WO | WO 98/32071 A3 | 7/1998 |
| 2003/0074473 A1 | 4/2003 | Pham et al. | | WO | WO 99/03776 A1 | 1/1999 |
| 2003/0076815 A1 | 4/2003 | Miller et al. | | WO | WO 99/21094 A2 | 4/1999 |
| 2003/0099223 A1 | 5/2003 | Chang et al. | | WO | WO 99/26860 A1 | 6/1999 |
| 2003/0102889 A1 | 6/2003 | Master et al. | | WO | WO 99/65818 A1 | 12/1999 |
| 2003/0105949 A1 | 6/2003 | Master et al. | | | | |

| | | | |
|---|---|---|---|
| WO | WO 00/19311 A1 | 4/2000 |
| WO | WO 00/65855 A1 | 11/2000 |
| WO | WO 00/69073 A1 | 11/2000 |
| WO | WO 01/11281 A1 | 2/2001 |
| WO | WO 01/22235 A1 | 3/2001 |
| WO | WO 01/76129 A2 | 10/2001 |
| WO | WO 02/12978 A2 | 2/2002 |

OTHER PUBLICATIONS

Adl-Tabatabai et al., "Code Reuse in an Optimizing Compiler," OOPSLA, ACM pp. 51-68 (1996).
Aggarwal et al.., "Efficient Huffman Decoding," International Conference on Image Processing IEEE 1:936-939 (Sep. 10-13, 2000).
Allan et al., "Software Pipelining," ACM Computing Surveys, 27(3):1-78 (Sep. 1995).
Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).
Altera APEX 20K 1999.
Andraka Consulting Group, "Distributed Arithmetic," Obtained from: http://www.fpga-guru.com/distribu.htm (1998-2000).
Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).
Bacon et al., "Compiler Transformations for High-Performance Computing," ACM Computing Surveys 26(4):368-373 (Dec. 1994).
Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).
Banerjee et al., "A MATLAB Compiler for Distributed, Heterogeneous, Reconfigurable Computing Systems," 2000 IEEE Symposium, pp. 39-48, (Apr. 17-19, 2000).
Bapte et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).
Baumgarte et al., "PACT XPP—A Self-Reconfigurable Data Processing Architecture," NN www.pactcorp.com/sneu/download/ersa01.pdf; retrieved on Nov. 25, 2005 (Jun. 25, 2001).
Becker et al., "An Application-Tailored Dynamically Reconfigurable Hardware Architecture for Digital Baseband Processing," IEEE Conference Proceedings Article pp. 341-346 (Sep. 18, 2000).
Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).
Bevstar, BevStar Bottled Water Model Advertisement *Automatic Merchandiser* at www.AMonline.com (2005).
Bevstar, BevStar Point of Use Water Model Advertisement *Automatic Merchandiser* at www.AMonline.com (2005).
Bickerstaff et al., "A Unified Turbo/Viterbi Channel Decoder for 3GPP Mobile Wireless in 0.18μ CMOS," IEEE *Journal of Solid-State Circuits* 37(11):1555-62 (2002).
Bishop & Loucks, "A Heterogeneous Environment for Hardware/Software Cosimulation," Proceedings of the 30th Annual Simulation Symposium, pp. 14-22 (Apr. 7-9, 1997).
Bogdan et al., "Power Reduction Techniques for a Viterbi Decoder Implementation,".
Brakensiek et al., "Re-Configurable Multi-Standard Terminal for Heterogeneous Networks," Radio and Wireless Conference, Rawcon 2002 IEEE. pp. 27-30 (2002).
Brown et al., "Quick PDA Data Exchange," PC Magazine pp. 1-3 (May 22, 2001).
Buck et al., "Ptolemy: A Framework for Simulating and Prototyping Heterogeneous Systems," International Journal of Computer Simulation 4:155-182 (Apr. 1994).

Burns et al., "A Dynamic Reconfiguration Run-Time System," Proceedings of the 5th Annual Symposium on Field-Programmable Custom Computing Machines, pp. 166-175 (Apr. 16, 1997).
Business Wire, "Whirlpool Internet-Enabled Appliances to Use Beeline Shopper Software Features," http://www.whirlpoocorp.com/news/releases/release.asp?rid=90 (Feb. 16, 2001).
Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).
Callahan et al., "Adapting Software Pipelining for Reconfigurable Computing," in Proceedings of the International Conference on Compilers, Architectrue and Synthesis for Embedded Systems p. 8, ACM (CASES '00, San Jose, CA) (Nov. 17-18, 2000).
Chang et al., "Low-Power Bit-Serial Viterbi Decoder for Next Generation Wide-Band CDMA Systems,".
Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).
Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).
Clark et al., "Error Correction Coding for Digital Communications," Plenum Press NY (1981).
Clarke, "Embedded Solutions Enters Development Pact with Marconi," EETimes Online (Jan. 26, 2000).
Compton & Hauck, "Reconfigurable Computing: A Survey of Systems and Software," ACM Press, ACM Computing Surveys (CSUR) 34(2):171-210 (Jun. 2002).
Compton et al., "Configuration Relocation and Defragmentation for Run-Time Reconfigurable Computing," Northwestern University, http://citeseer.nj.nec.com/compton00configuration.html, pp. 1-17 (2000).
Conte et al., "Dynamic Rescheduling: A Technique for Object Code Compatibility in VLIW Architectures," Proceedings of the 28th Annulal International Symposium on Microarchitecture pp. 208-218 (Nov. 29, 1995).
Conte et al., "Instruction Fetch Mechanisms for VLIW Architectures with Compressed Encodings," Proceedings of the Annual IEEE/ACM International Symposium on Microarchitecture (MICRO) 29:201-211 (Dec. 2, 1996).
Cray Research Inc., "Cray T3E Fortran Optimization Guide," Ver. 004-2518-002, Section 4.5 (Jan. 1999).
Cummings et al., "FPGA in the Software Radio," IEEE Communications Magazine . 37(2):108-112 (Feb. 1999).
Dandalis et al., "An Adaptive Cryptograhic Engine for IPSec Architectures," IEEE pp. 132-141 (Jan. 2000).
David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).
Deepakumara et al., "FPGA Implementation of MD5 has Algorithm," Canadian Conference on Electrical and Computer Engineering, IEEE (2001).
Dehon et al., "Reconfigurable Computing: What, Why and Implications for Design Automation," Design Automation Conference Proceedings pp. 610-615 (1999).
Dipert, "Figuring Out Reconfigurable Logic," EDN 44(16):107-114 (Aug. 5, 1999).
Dominikus, "A Hardware Implementation of MD4-Family Hash Algorithms," 9th International Conference on Electronics, Circuits and Systems IEEE (2002).
Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html (Mar. 2001).
Drozdowski, "Scheduling Multiprocessor Tasks—An Overview," Instytut Informatyki Politechnika, pp. 1-31 (Jan. 31, 1996).
Ebeling et al., "RaPiD Reconfigurable Pipelined Datapath," Springer-Verlag, 6th International Workshop on Field-Programmable Logic and Applications pp. 126-135 (1996).

Fawer et al., "A Multiprocessor Approach for Implementing a Time-Diversity Spread Specturm Receiver," Proceeding sof the 1990 International Zurich Seminal on Digital Communications, pp. 173-180 (Mar. 5-8, 1990).

Fisher, "Gone Flat," Forbes pp. 76-79 (Oct. 2001).

Fleischmann et al., "Prototyping Networked Embedded Systems," Integrated Engineering, pp. 116-119 (Feb. 1999).

Forbes "Best of the Web—Computer Networking/Consumer Durables," *The Forbes Magnetic 40* p. 80 (May 2001).

Garrett et al, "Low Power Architecture of the Soft-Output Viterbi Algorithm,".

Gibson, "Fresh Technologies Will Create Myriad Functions," FT Information Technology Review; World Wide Web at http://technews.acm.org/articles/2000-2/0301w.html?searchterm=%22fresh+technologies%22 (Mar. 1, 2000).

Gluth, "Integrierte Signalprozessoren," Elektronik 35(18):112-118 Franzis Verlag GMBH, Munich, Germany (Sep. 5, 1986).

Gokhale & Schlesinger, "A Data Parallel C and Its Platforms," Proceedings of the Fifth Symposium on the Frontiers of Massively Parallel Computation pp. 194-202 (Frontiers '95) (Feb. 1995).

Grimm et al., "A System Architecture for Pervasive Computing," Washington University, pp. 1-6 (Sep. 2000).

Halbwachs et al., "The Synchronous Data Flow Programming Language LUSTRE," Proceedings of the IEEE 79(9):1305-1319 (Sep. 1991).

Hammes et al., "Cameron: High Level Language Compilation for Reconfigurable Systems," Proc. of the Intl. Conf. on Parallel Architectures and Compilation Techniques, pp. 236-244 (Oct. 1999).

Hanna et al., "A Normalized Backpropagation Learning Algorithm for Multilayer Feed-Forward Neural Adaptive Filters," *Neural Networks for Signal Processing XI*, Proceedings of the 2001 IEEE Signal Processing Society Workshop pp. 63-72 (Sep. 2001).

Hartenstein, "Coarse Grain Reconfigurable Architectures," Design Automation Conference, 2001. Proceedings of the ASP-Dac 2001, Asian and South Pacific Jan. 30-Feb. 2, 2001, Piscataway, NJ, US, IEEE, pp. 564-569 (Jan. 30, 2001).

Heinz, "An Efficiently Compilable Extension of {M}odula-3 for Problem-Oriented Explicitly Parallel Programming," Proceedings of the Joint Symposium on Parallel Processing (May 1993).

Hekstra, "An Alternative to Metric Rescaling in Viterbi Decoders," IEEE Transactions on Communications vol. 37 No. 11 (Nov. 1989).

Hendrix, "Viterbi Decoding Techniques in the TMS320C54x Family," Texas Instruments Application Note (Jun. 1996).

Hinden et al., "The DARPA Internet: Interconnecting Heterogeneous Computer Networks with Gateways," IEEE Computer Magazine pp. 38-48 (1983).

Horton, "Beginning Java 2:JDK 1.3 Edition," Wrox Press, Chapter 8, pp. 313-316 (Feb. 2001).

Huff et al., "Lifetime-Sensitive Modulo Scheduling," 6th Conference on Programming Language, Design and Implementation, pp. 258-267, ACM (1993).

IBM, "Multisequencing a Single Instruction Stream Scheduling with Space-time Trade-offs," IBM Technical Disclosure Bulletin 36(2):105-108 (Feb. 1, 1993).

IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).

Internet Wire, Sunbeam Joins Microsoft in University Plug and Play Forum to Establish A "Universal" Smart Appliance Technology Standard (Mar. 23, 2000).

Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).

Isoworth, "Isoworth Beverage Dispensing Technology Worldwide Company," Brochure (May 22, 2000).

Jain et al., "An Alternative Approach Towards the Design of Control Units," Microelectronics and Reliability 24(6):1009-1012 (1984).

Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).

Janssen et al., "Partitioned Register File for TTAs," Proceedings of the 28th Annual International Symposium on Microarchitecture, pp. 303-312 (Nov. 1995).

Janweijer et al., "A Compact Robin Using the SHarc (CRUSH)," Obtained from: http://www.nikhef.nl/~peterj/Crush/CRUSH-hw.pdf (Sep. 1998).

Jong-Pyng et al., "Real-Time Virtual Channel Flow Control," Proceedings of the Annual International Phoenix Conference on Computers and Communications, Conf. 13, pp. 97-103 (Apr. 12, 1994).

Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).

Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, US 2(Conf. 42):1038-1041 (May 10-13, 1992).

Kim et al, "Implementation of Convolutional Encoder and Viterbi Decoder for Wideband CDMA PCS Baseband Processing Unit Using Multiple TMS320C40s,".

Kneip et al., "An Algorithm Adapted Autonomous Controlling Concept for a Parallel Single-Chip Digital Signal Processor," Journal of VLSI Signal Processing Systems for Signal, Image, an dVideo Technology 16(1):31-40 (May 1, 1997).

Lee & Messerschmitt, "Pipeline Interleaved Programmable DSP's: Synchronous Data Flow Programming," IEEE Transactions on Acoustics, Speech, and Signal Processing ASSP-35(9):1334-1345 (Sep. 1987).

Lee & Messerschmitt, "Synchronous Data Flow," Proceedings of the IEEE 75(9):1235-1245 (Sep. 1987).

Lee & Parks, "Dataflow Process Networks," Proceedings of the IEEE 83(5):773-799 (May 1995).

Liu et al., "Scheduling Algorithms for Multiprogramming in a Hard-Real-Time Environment," *Journal of the Association for Computing* 20(1):46-61 (1973).

Llosa et al., "Lifetime-Sensitive Modulo Scheduling in a Production Environment," IEEE Trans. on Comps. 50(3).234-249 (Mar. 2001).

Lu et al., "The Morphosys Dynamically Reconfigurable System-On-Chip," Proceedings of the First NASA/DOD Workshop on Evolvable Hardware, pp. 152-160 (Jul. 19, 1999).

Mangione-Smith et al., "Seeking Solutions in Configurable Computing," *Computer* 30(12):38-43 (Dec. 1997).

Manion, "Network CPU Adds Spice," Electronic Engineering Times, Issue 1126 (Aug. 14, 2000).

Mascia & Ishii., "Neural Net Implementation on Single-Chip Digital Signal Processor," IEEE (1989).

Matache et al., "Trellis Coding for Diagonally Layered Space-Time Systems,".

Mcgraw, "Parallel Functional Programming in Sisal: Fictions, Facts, and Future," Lawrence Livermore National Laboratory pp. 1-40 (Jul. 1993).

Najjar et al., "High-Level Language Abstraction for Reconfigurable Computing," *Computer* 36(8):63-69 (Aug. 2003).

Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).

Openmp Architecture Review Board, "OpenMP C and C++ Application Program Interface," pp. 7-16 (Oct. 1998).

Oracle Corporation, "Oracle8i JDBC Developer's Guide and Reference," Release 3, 8.1.7, pp. 10-8-10-10 (Jul. 2000).

Paaske et al., "High Speed Viterbi Decoder Architecture," First ESA Workshop on Tracking, Telemetry and Command Systems, ESTEC (Jun. 1998).

Pauer et al., "Algorithm Analysis and Mapping Environment for Adaptive Computing Systems: Further Results," Proc. IEEE Symposium on FPGA's for Custom Computing Machines (FCCM), Napa CA (1999).

Pauer et al., "Algorithm Analysis and Mapping Environment for Adaptive Computing Systems," Presentation slides, Third Bi-annual Ptolemy Miniconference (1999).

Rajagopalan et al., "A Flexible Multiplication Unit for an FPGA Logic Block," *Circuits and Systems* 4:546-9 (2001).

Ramamritham et al., "On Scheduling Algorithms for Real-Time Multiprocessor Systems," Algorithms and Applications, Proceedings of the International conference on Parallel Processing 3:143-152 (Aug. 8, 1989).

Schneider, "A Parallel/Serial Trade-Off Methodology for Look-Up Table Based Decoders," Proceedings of the Design Automation Conference 34:498-503 (Jun. 9-13, 1997).

Sidhu etal., "A Self-Reconfigurable Gate Array Architecture," 10 International Workshop on Field Programmable Logic and Applications http://coblitz.codeen.org:3125/citeseer.ist.psu.edu/cache/papers/cs/17524/http:zSzzSzmaarcii.usc.eduzSzPublicationsZSzsidhu_fp100.pdf/sidhu00selfreconfigurable.pdf retrieved on Jun. 21, 2006 (Sep. 1, 2001).

Smith, "Intro to ASICs: ASIC Cell Libraries," at http://iroi.seu.edu.cn/books/asics/Book2/CH01/CH01.5.htm, printed on Feb. 4, 2005 (Jun. 1997).

Souza, "Computing's New Face—Reconfigurable Devices Could Rattle Supply Chain," Electronic Buyers' News Issue 1205, p. P.1 (Apr. 3, 2000).

Souza, "Quicksilver Buys White Eagle," Electronic Buyers News, Issue 1220 (Jul. 17, 2000).

Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).

Steiner, "Coke Chief's Latest Daft Idea—A Cola Tap in Every House," Sunday Times (Mar. 2001).

Sun Microsystems, "FORTRAN 3.0.1 User's Guide, Revision A," pp. 57-68 (Aug. 1994).

Svensson, "Co's Join On Home Web Wiring Network," Associated Press Online printed on Apr. 30, 2008 (Jun. 2000).

Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).

Vaya, "VITURBO: A Reconfigurable Architecture for Ubiquitous Wireless Networks," A Thesis Submitted in Partial Fulfillment of the Requirements for the Degree Master of Science; Rice University (Aug. 2002).

Wang et al., "Cell Search in W-CDMA," IEEE Journal on Selected Areas in Communications 18(8):1470-1482 (Aug. 2000).

Wardell, "Help for Hurried Cooks?," Popular Science, p. 32 (May 2000).

Whiting & Pascoe, "A History of Data-Flow Languages," IEEE Annals of the History of Computing 16(4):38-59 (1994).

Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).

Wirthlin et al., "A Dynamic Instruction Set Computer," Proceedings of the IEEE Symposium on FPGA's for Custom Computing Machines, pp. 99-107 (Apr. 21, 1995).

WWW.APPLIANCEMAGAZINE.COM, World Wide Web at http://web.archive.org/web/20000511085402/http://www.appliancemagazine.com/ printed on Apr. 30, 2008.

WWW.BESTROM.COM, BreakMateTM from www.bestrom.com printed on Apr. 29, 2008.

WWW.BEVERAGEEXPRESS.COM, Beverage Express from www.beverageexpress.com printed on Apr. 30, 2008.

WWW.BEVSTAR.COM, Isoworth Beverage Dispensing Technology Worldwide from www.bevstar.com printed on Apr. 30, 2008.

WWW.BONATOR.COM, from The World Wide Web at http://web.archive.org/web/20000510102440/http://www.bonator.com/ printed on Apr. 30, 2008.

WWW.ECOMMERCE.DEWPOINTINC.COM, Swiss Mountain Coffees from www.ecommerce.dewpointinc.com printed on Apr. 30, 2008.

WWW.GATEWAY.COM, World Wide Web, http://web.archive.org/web/20000229192734/www.gateway.com/productpages/9300splash/index.shtml Available on Mar. 3, 2000, 1 page (Mar. 3, 2000).

WWW.ICL.COM, from the World Wide Web at http://www.icl.com printed on Apr. 30, 2008.

WWW.MARGHERITA2000.COM; from Margherita2000.com printed Apr. 30, 2008 (Jan. 26, 2001).

WWW.SODACLUBENTERPRISES.Com, Soda-Club Enterprises from www.sodaclubenterprises.com printed on Apr. 30, 2008.

WWW.SYMBOL.COM, Symbol from www.symbol.com printed on Apr. 30, 2008.

WWW.WUNDERBAR.COM, Wunder-Bar Dispensing Systems from www.wunderbar.com printed on Apr. 30, 2008.

Xilinx Data Book 1998.

Xilinx Virtex 1.1 1998.

Xilinx Virtex 2.2 2000.

Xilinx, "Virtex-II Pro Platform FPGAs: Functional Description DS083-2 (v2.5)," Product Specification, pp. 13-46 (Jan. 20, 2003).

Yeo et al., "Implementation of High Throughput Soft Output Viterbi Decoders," Proc. IEEE Workshop on Signal Processing Systems pp. 146-151 San Diego CA (Oct. 2002).

Young, "Architecture Powers up IPSec, SSL," EETimes, Los Gatos, CA, pp. 1-4 http://www.eetimes.com/story/OEG20011102S0065 (Nov. 2, 2001).

Yuan et al., "A Decomposition Approach to Non-Preemptive Real-Time Scheduling," Real Time Systems 6(1):7-35 (1994).

Zaino et al., "Algorithm Analysis and Mapping Environment for Adaptive Computing Systems," Final Technical Report, DARPA Contract F33615-97-C-1174 (Sep. 2001).

Zhang et al., "A 1V Heterogeneous Reconfigurable Processor IC for Baseband Wireless Applications," 2000 IEEE Solid.

* cited by examiner

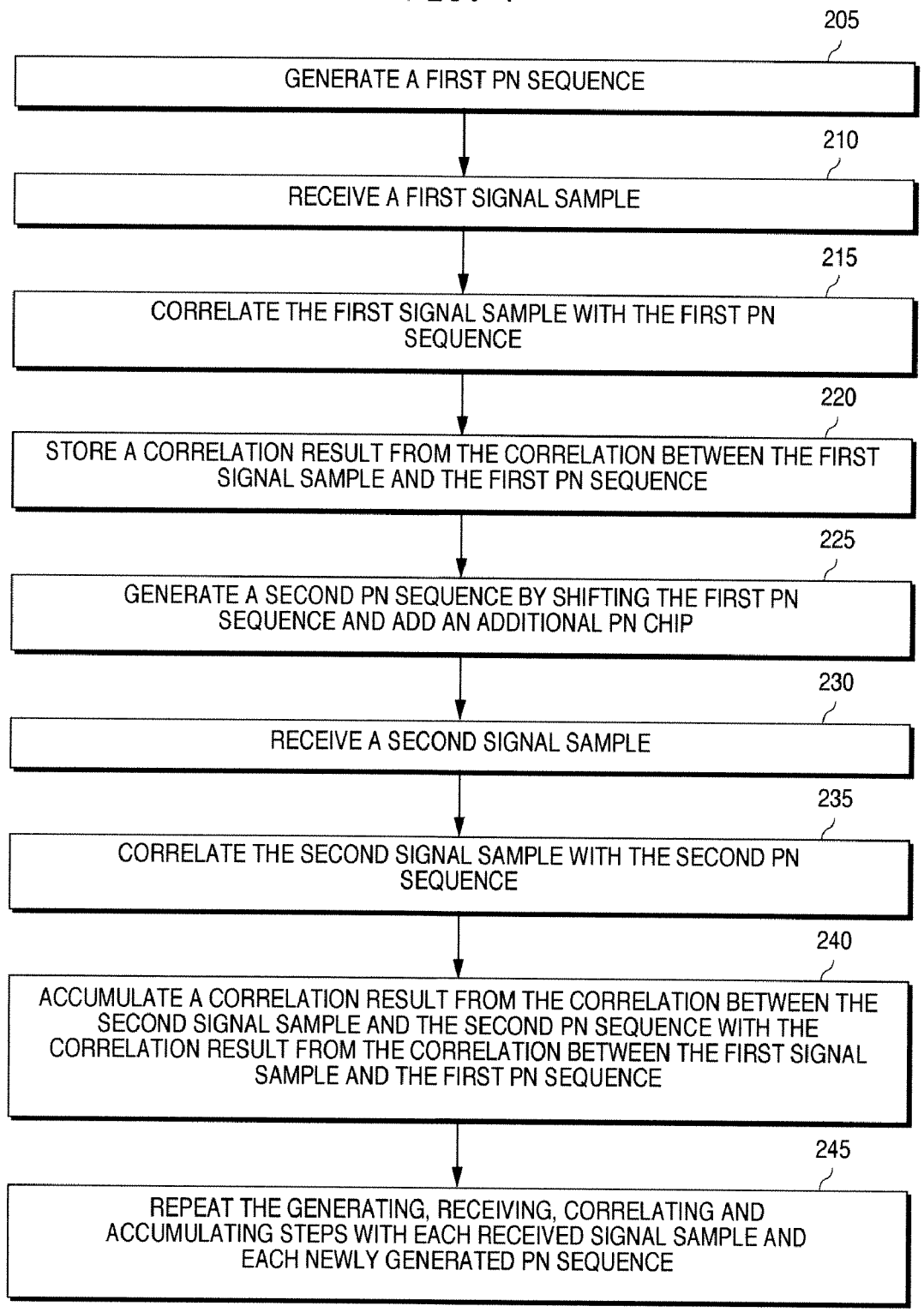

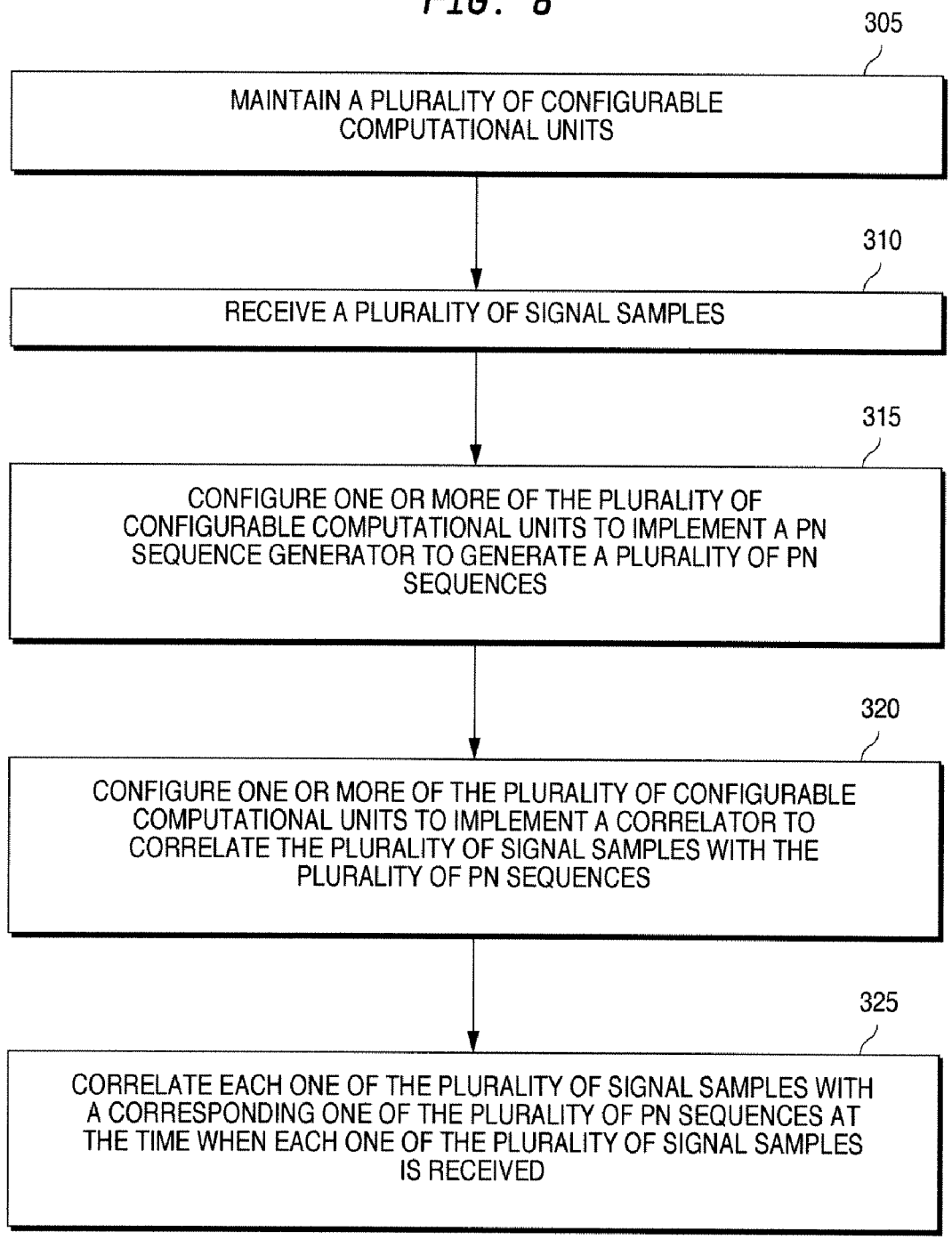

COMMUNICATIONS MODULE, DEVICE, AND METHOD FOR IMPLEMENTING A SYSTEM ACQUISITION FUNCTION

CROSS-REFERENCES TO RELATED APPLICATIONS

This application is a continuation of U.S. patent application Ser. No. 12/141,822, filed Jun. 18, 2008, which is a continuation of U.S. patent application Ser. No. 10/067,496, filed Feb. 4, 2002, now issued as U.S. Pat. No. 7,400,668 on Jul. 15, 2008, which is a continuation-in-part application of U.S. patent application Ser. No. 09/815,122, filed Mar. 22, 2001, now issued as U.S. Pat. No. 6,836,839 on Dec. 28, 2004, the disclosures of each of the aforementioned applications are hereby incorporated by reference in their entirety as if set forth in full herein for all purposes.

BACKGROUND OF THE INVENTION

The present invention generally relates to communications functions. More specifically, the present invention relates to a communications module, device, and method for implementing a system acquisition function.

In CDMA communication systems, each base station differentiates amongst one another by using an unique PN code. A communication device, such as a mobile phone, is equipped with a system acquisition function, typically embodied in a searcher, to search for and locate the PN codes of the base stations within the vicinity of the mobile phone. Upon power-on, one of the initial tasks of the mobile phone is to find the strongest pilot signal from the nearby base stations as soon as possible. The task of finding the strongest pilot signal is commonly known as system or pilot acquisition and is usually performed by a searcher within the mobile phone.

Under one conventional approach, the system acquisition function within the mobile phone is implemented in the form of the searcher using a serial search technique that only utilizes a set of complex correlators to search for the correlation peak from one PN code offset to another. This approach consumes less power and requires less hardware; however, the search for the correlation peak may take longer.

Under another conventional approach, the searcher within the mobile phone is implemented using a traditional parallel search technique that utilizes several sets of fixed, dedicated correlators to compute the correlation peak in a concurrent manner. This other approach may shorten the search time but it does so at cost of incurring more hardware and power consumption. Furthermore, since the acquisition mode is typically less active than other modes, the exclusive use of fixed, dedicated correlators often results in a waste of hardware resources within the mobile phone.

More specifically, system or pilot acquisition in a CDMA communication system is typically performed as follows. Each base station continually broadcasts its own unique PN code in a periodic manner. One PN code from one base station differs from another PN code from another base station by an offset. Before a PN code can be identified by the mobile phone, the mobile phone first searches for signals at a particular frequency. As a result, only signals from base stations transmitting at that particular frequency are received by the mobile phone.

Next, the PN code of the base station which transmits the strongest pilot signal is identified and synchronized. The mobile phone receives signals from different base stations and these received signals are added up. Typically, the received signals are stored by the mobile phone before the correlation process begins. The mobile phone has a local PN sequence generator which is capable of generating sequences of PN codes. Initially, before the PN code of the base station which transmits the strongest pilot signal is identified, the PN sequence generator generates an initial PN code. This initial PN code is correlated with the received signals by a correlator residing in the mobile phone. Correlation is done to determine the power level of the received signals. The correlation results are examined to determine if the received signals representing the PN code of the transmitting base station fall within an acceptable time delay from the initial PN code to qualify as the strongest pilot signal. If the correlation results are below a predetermined threshold, i.e., the initial PN code generated by the local PN sequence generator does not qualify as the strongest pilot signal, then the local PN sequence generator shifts by one chip to generate another PN code and this other PN code is correlated with the received signals. The generation of PN codes and the correlation of these codes with the received signals continue until the strongest pilot signal is identified.

When the strongest pilot signal is identified, the PN code generated by the PN sequence generator and used to identify the strongest pilot signal is synchronized with the PN code of the base station which transmits the strongest pilot signal. Once the synchronization of the PN code is achieved, the mobile phone is able to communicate with the base station.

Furthermore, after pilot acquisition is completed, the mobile phone continues searching for nearby strong pilot signals and maintains a list to keep track of such signals. This process is commonly called set maintenance. That is, in addition to the strongest pilot signal, the mobile phone also searches for and keeps track of a number of additional pilot signals (and their associated PN codes) with different levels of signal strength. For example, the mobile phone may maintain an active set which keeps track of additional multipaths associated with the pilot signal of the base station that the mobile phone is currently communicating with, a candidate set with pilot signals whose strengths exceed certain threshold, and a neighbor set that includes pilot signals from cells that are in the vicinity of the cells that the mobile phone is communicating with. Maintaining a number of additional pilot signals (and their associated PN codes) facilitates the handoff process. A handoff typically occurs when a mobile phone is roaming from one area to another. This happens when a pilot signal transmitted from another base station is stronger than the one that the mobile phone is currently communicating with. The candidate set may be used to more efficiently identify the new base station transmitting the strongest pilot signal. This is because the strongest pilot signal is more likely to be one of the signals included in the candidate set. Hence, the associated PN code can be retrieved more quickly and communication with the new base station likewise can be established in a shorter period of time.

As can be seen above, the received signals need to be stored by the mobile phone so they can be subsequently used for correlation purposes. Furthermore, generation of the PN codes by the PN sequence generator is done in a sequential manner by shifting the current PN code.

Hence, it would be desirable to provide a method and system to implement a searcher for use with a mobile phone to more efficiently identify the PN code of the base station which transmits the strongest pilot signal.

SUMMARY OF THE INVENTION

A method and system for implementing a system acquisition function for use with a communication device is provided. According to one exemplary embodiment of the system, the system acquisition function is embodied in a searcher. The searcher is embedded in the communication device, such as, a mobile phone. The searcher includes one or more computational units which are used to perform a PN sequence generation function to generate PN sequences. Each PN sequence is comprised of a number of PN chips. The searcher further includes a number of computational units which are used to correlate received signal samples with the PN chips generated by the PN sequence generation function. As each signal sample is received by the communication device, the received signal sample is correlated (complex multiplied) with a PN sequence in a parallel manner using the computational units. The sample correlation results are then respectively accumulated within each computational unit that conducts the corresponding sample correlation. As the next signal sample is received, this newly received signal sample is similarly correlated with the next PN sequence in a parallel manner. Likewise, the sample correlation results are also accumulated. The foregoing process is repeated until all the signal samples needed to complete a signal correlation are received and correlated with the PN sequences. The number of PN chips within a PN sequence used to correlate with each received signal sample is equivalent to a correlation length chosen such that the correlation results between each received signal sample and the locally generated PN sequence are sufficiently reliable to determine whether the strongest pilot is found.

According to another aspect of the system, the computational units are implemented using adaptive hardware resources. The number of computational units which are used to implement the PN sequence generation function and the correlation function are adjustable depending on, for example, the amount of available adaptive hardware resources.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 7 is a flow diagram illustrating a first exemplary method embodiment in accordance with the present invention; and FIG. 8 is a flow diagram illustrating a second exemplary method embodiment in accordance with the present invention.

DETAILED DESCRIPTION OF THE INVENTION

Figure 1:
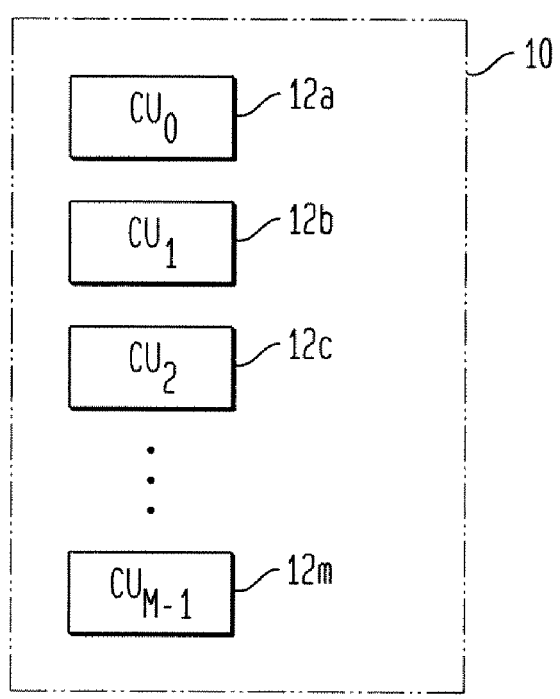
FIG. 1 is a simplified diagram illustrating an exemplary embodiment of an M-node having four (4) computational units in accordance with the present invention.

The present invention in the form of one or more exemplary embodiments will now be described. FIG. 1 is a simplified diagram illustrating an exemplary embodiment of the present invention. Referring to FIG. 1, there is shown a searcher 10 having a number of computational units 12a-m. The searcher 10 can be located in any type of communication device, such as a mobile phone. As will be further demonstrated below, each computational unit 12a-m correlates the received signal samples with a corresponding PN chip. In an exemplary embodiment, these computational units 12a-m are implemented using reconfigurable hardware resources within an adaptive computing architecture. Details relating to the adaptive computing architecture and how reconfigurable hardware resources are used to implement functions on an on-demand basis are disclosed in U.S. Pat. No. 6,836,839, issued Dec. 28, 2004, the disclosure of which is hereby incorporated by reference in their entirety as if set forth in full herein for all purposes. It should be understood that while the present invention is described as being in the searcher 10, it will be appreciated by a person of ordinary skill in the art that the present invention can be implemented in other manners within a communication device. For example, some or all of the functionality of the present invention as described herein may be implemented outside of the searcher 10 in other parts of the communication device.

In an exemplary embodiment, the computational units 12a-m are arranged in a sequential order and configured to calculate the correlations between the received signal samples and a number of PN sequences. The start of any two adjacent PN sequences is offset by one chip. More specifically, the computational units 12a-m correlate each received signal sample with their corresponding components of a PN sequence in a parallel manner.

The PN sequences used by the computational units 12a-m are generated in a successive, offset order. The starting position of each successive PN sequence is only one chip off from the preceding PN sequence. The PN chips of each PN sequence can be provided to the computational units 12a-m in a number of ways. For example, the PN chips can be generated by either a PN sequence generator implemented in the form of another computational unit (not shown) or a RISC processor. As will be described further below, each PN chip is shifted into a corresponding computational unit 12a-m. Each computational unit 12a-m includes a local memory for storing its corresponding PN chip.

Figure 2:
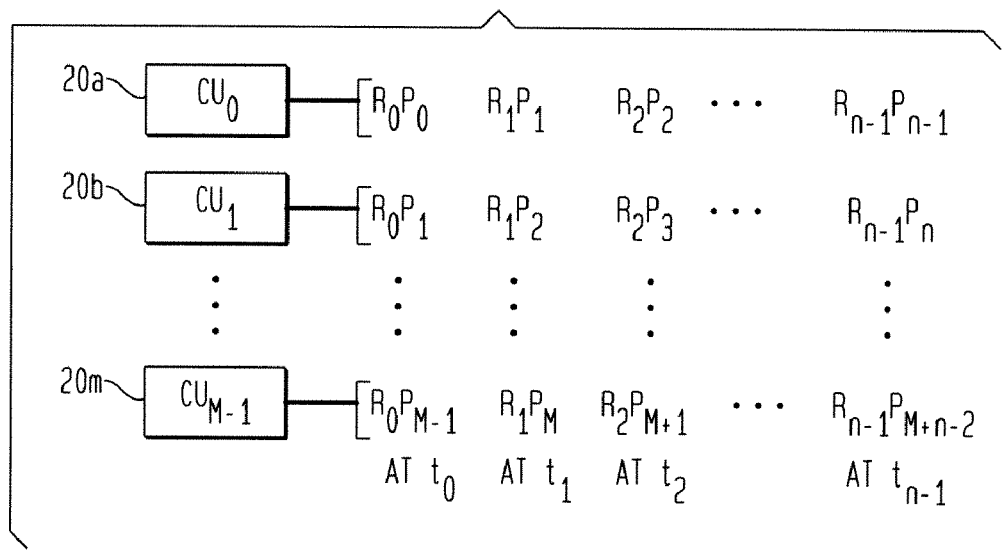
FIG. 2 is a simplified diagram illustrating an exemplary method for performing correlations in accordance with the present invention.

FIG. 2 illustrates an exemplary method for performing correlations in accordance with the present invention. Assume the time duration of a received signal sample is $T_d$, that is, one signal sample is received every $T_d$. Then, conversely, the frequency of the received signal sample is $1/T_d = f_d$.

Figure 6:
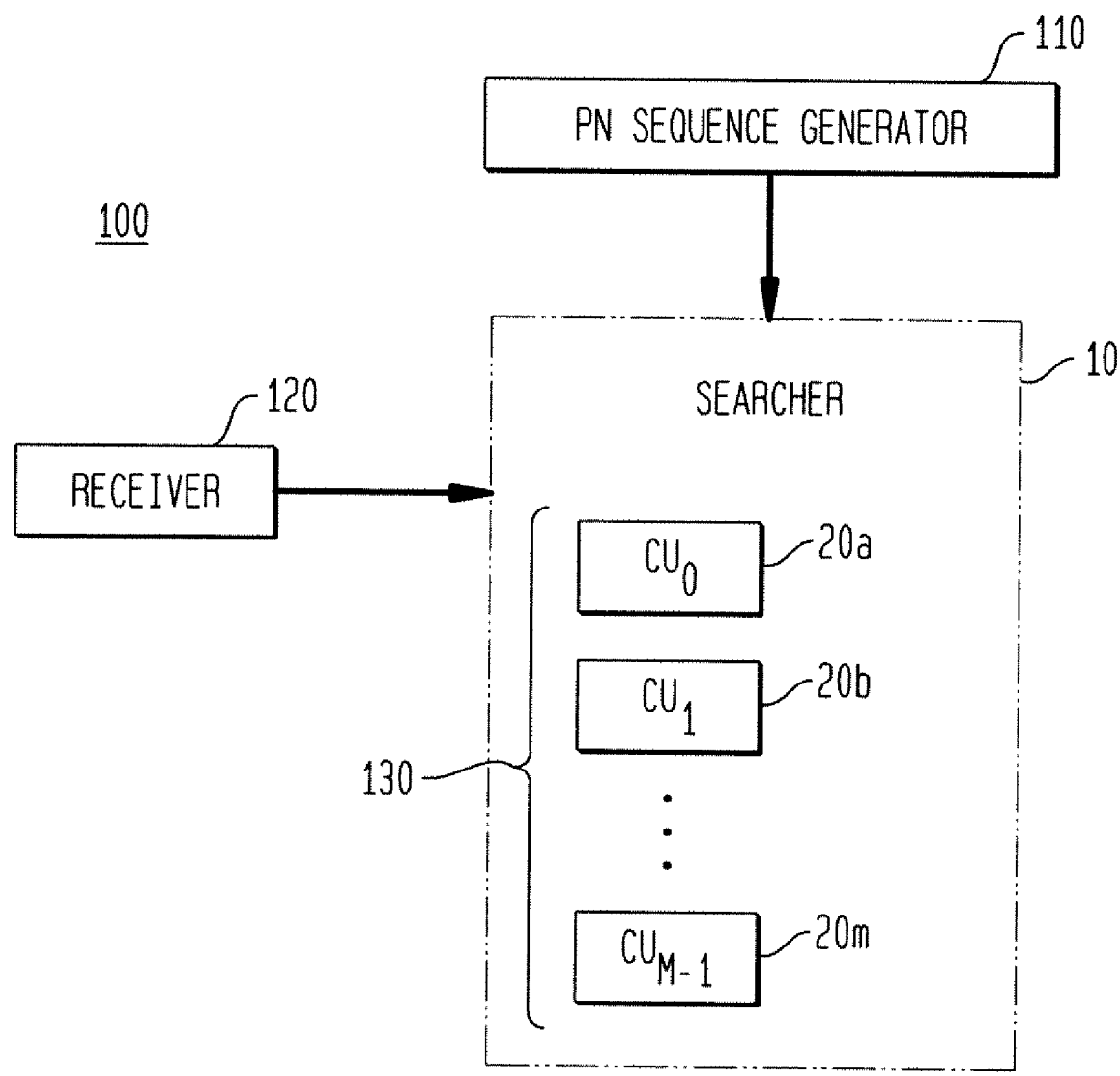
FIG. 6 is a block diagram illustrating an exemplary system embodiment in accordance with the present invention.

Referring to FIG. 2, there are m computational units 20a-m within the searcher 10. At time $t_0$, signal sample $R_0$ is received by a receiver (not shown) located within the communication device. Signal sample $R_0$ is then correlated with the PN sequence, $P_0 P_1 \ldots P_{M-1}$. The PN sequence, $P_0 P_1 \ldots P_{M-1}$, is generated by a PN sequence generator (as shown in FIG. 6) located within the communication device. Since there are M PN chips within the PN sequence, M computational units 20a-m are used to do the correlations in parallel. Hence, each computational unit 20a-m correlates the signal sample $R_0$ with one PN chip. For example, computational unit 20*a* correlates $R_0$ with $P_0$ to generate correlation result $R_0P_0$. The collective correlation results generated by the computational units 20*a-m* are as follows: $R_0P_0, R_0P_1, \ldots, R_0P_{M-1}$. The correlations are performed and the correlation results are respectively accumulated into the computational units 20*a-m* before the next signal sample $R_1$ is received at time $t_1$. The signal sample $R_0$ may then be discarded after the correlations are performed.

At time $t_1$, signal sample $R_1$ is received. Signal sample $R_1$ is then correlated with a second PN sequence, $P_1P_2 \ldots P_M$. The PN sequence, $P_1P_2 \ldots P_M$, is only a shift of the PN sequence used at time to plus a newly generated PN chip $P_M$. That is, the start of the new PN sequence is offset by one chip from the preceding PN sequence. Consequently, the new PN sequence can be supplied to or propagated through the computational units 20*a-m* as follows. Except for the last computational unit 20*m*, each computational unit 20*a-l* receives its corresponding PN chip for the next correlation from its neighbor. The last computational unit 20*m* receives its corresponding PN chip $P_M$ from the PN sequence generator. In other words, except for the first computational unit 20*a*, each remaining computational unit 20*b-m* passes its current PN chip to its neighbor in the same direction. As to the first computational unit 20*a*, its current PN chip is discarded; and as to the last computational unit 20*m*, as mentioned above, the PN sequence generator provides the next PN chip. For example, after the correlations are completed for the received signal sample $R_0$ (which is some time before time $t_1$), computational unit 20*a* discards its current PN chip $P_0$ and receives its next PN chip (which will be $P_1$) from computational unit 20*b*; computational unit 20*m* passes its current PN chip $P_{M-1}$ to its neighboring computational unit 20*l* (not shown) and receives its next PN chip $P_M$ from the PN sequence generator; and the remaining computational units 20*b-l* pass their current PN chips respectively to their neighbors in one direction and receive their next PN chips respectively from their neighbors in the other direction.

Again, since there are M PN chips within a PN sequence, M computational units 20*a-m* are used to do the correlations in parallel. This time around, the collective correlation results generated by the computational units 20*a-m* are as follows: $R_1P_1, R_1P_2, \ldots, R_1P_M$. The correlations are performed and the results are accumulated with the correlation results that were done at time $t_0$ before the next signal sample $R_2$ is received at time $t_2$. Hence, for example, before time $t_2$, computational unit 20*a* contains correlation results $R_0P_0$ and $R_1P_1$. The foregoing process is repeated until the last signal sample $R_{n-1}$ is received at time $t_{n-1}$ and then correlated with the PN sequence, $P_{n-1}P_n \ldots P_{M+n-2}$ generating the following collective correlation results: $R_{n-1}P_{n-1}, R_{n-1}P_n, \ldots R_{n-1}P_{M+n-2}$.

At the end of the time period, $t_{n-1}+T_d$, the correlation results for the received signal samples, $R_0R_1 \ldots R_{n-1}$, with n different PN sequences that are offset by one chip between the start of any two adjacent PN sequences, are then obtained. For example, $R_0P_0+R_1P_1+ \ldots +R_{n-1}P_{n-1}$ represent the correlation results accumulated at computational unit 20*a*. Also, at the end of the time period, $t_{n-1}+T_d$, M different PN code offsets have been searched. If the number of PN chips, within a PN sequence, that need to be searched is M or fewer, then the entire search process is completed at the end of the time period $t_{n-1}+T_d$.

Figure 3:
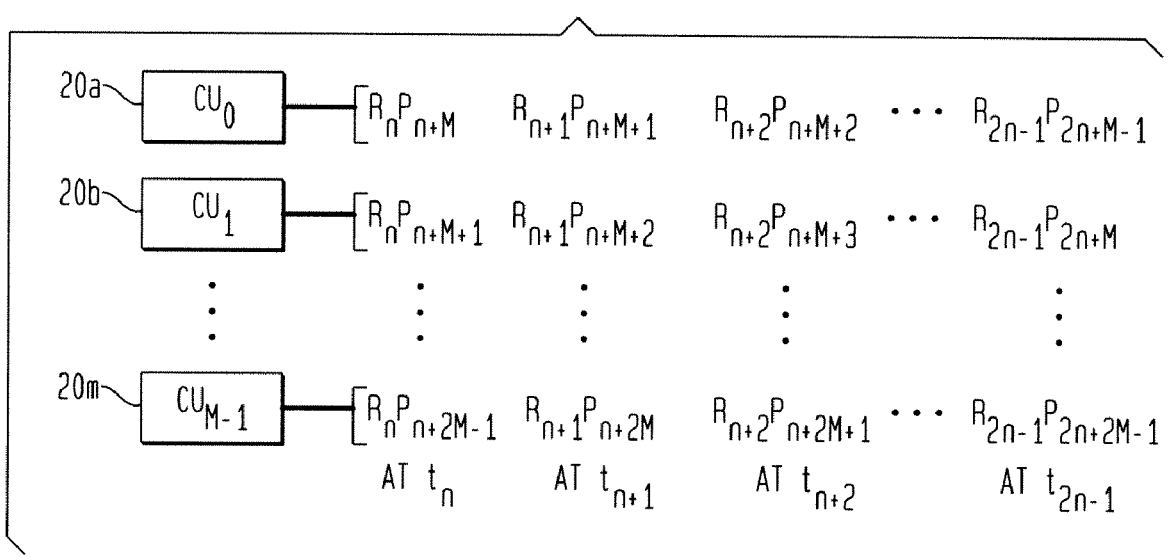
FIG. 3 is a simplified diagram illustrating the exemplary method as shown in FIG. 2 for performing an additional round of correlations in accordance with the present invention.

If the number of PN chips, within a PN sequence, that need to be searched is more than M, then a second round of search or correlations (or additional rounds if necessary) may be performed. The length (time-wise) of a round of correlations is the time period $t_{n-1}+T_d$. For example, FIG. 3 illustrates this second round of correlations. Before the second round of correlations begins, the accumulated correlation results in each of the computational unit 20*a-m* are transferred and stored in other memory locations and then cleared. Referring to FIG. 3, in the second round of correlations, the received signal sample $R_n$ is correlated by the computational units 20*a-m* with the PN sequence, $P_{n+M}P_{n+M+1} \ldots P_{n+2M-1}$ at time $t_n$. The correlation results are then accumulated at each of the computational unit 20-*a-m*.

At time $t_{n+1}$, the signal sample $R_{n+1}$ is correlated with the next PN sequence, $P_{n+M+1}P_{n+M+2} \ldots P_{n+2M}$. Similarly, the start of this next PN sequence is offset from the preceding PN sequence by one chip and a new PN chip is added at the end. This process will continue until the second round of correlations is completed. For the second round of real-time correlations, another M PN offsets ($P_M, P_{M+1}, \ldots, P_{2M+1}$) are searched. The correlation results are then stored and cleared from each computational unit 20*a-m* before the next round of correlations starts.

According to the exemplary method shown in FIG. 2, all the received signal samples $R_x$ are not stored first and then later used for correlation purposes. Instead, as each signal sample $R_x$ is received, the signal sample $R_x$ is correlated with M PN chips and then accumulated. The collective correlation results for all the received signal samples $R_x$ are then examined to identify the PN sequence which corresponds to the strongest pilot signal. Hence, the collective correlation results for the received signal samples $R_x$ can be derived much faster. In addition, since all the received signal samples $R_x$ need not be stored before the correlation function is performed, the memory overhead and hardware requirements and costs correspondingly become less.

As can be seen from FIG. 2, for each time period $T_d$, M computational units 20*a-m* are used to correlate a received signal sample $R_x$ with a PN sequence which has M PN chips. For each time period $T_d$, each computational unit 20*a-m* performs one correlation. As a result, with M computational units 20*a-m*, M correlations are collectively performed. As will be further described below, the number of computational units 20*a-m* which are used to perform the correlations is scalable. That is, the number of computational units 20*a-m* may vary depending on the amount of hardware resources available and the clock rate that is used to drive each computational unit.

Referring back to FIG. 2, for each time period $T_d$ and a PN sequence with M PN chips, each computational unit performs one correlation thereby resulting in M correlations being performed. However, each computational unit is not necessarily restricted to performing one correlation during each time period $T_d$.

Figure 4:
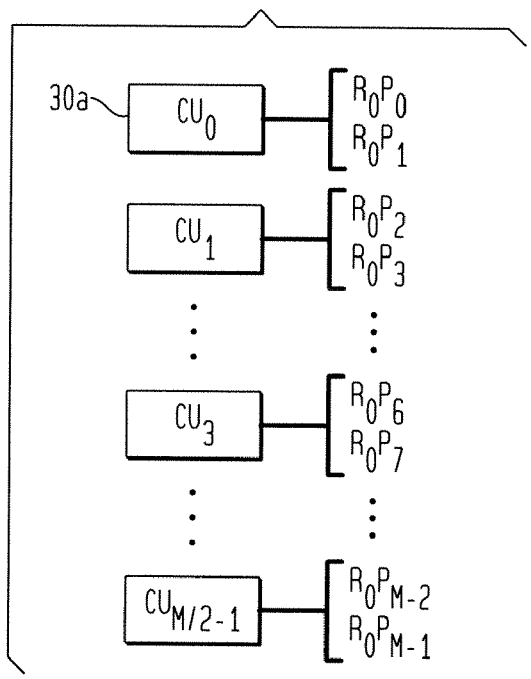
FIG. 4 is a simplified diagram illustrating a second exemplary method for performing correlations in accordance with the present invention.

Each computational unit may perform two or more correlations per time period $T_d$. While M correlations are to be performed per time period $T_d$, these M correlations may be collectively performed by a fewer number of computational units. For example, referring to FIG. 4, there are M/2 computational units. In this case, each of the M/2 computational units is driven to perform two (2) correlations within the time period $T_d$; for instance, computational unit 30*a* performs two (2) correlations and generates correlation results $R_0P_0$ and $R_0P_1$. In order to perform two (2) correlations with the time period $T_d$, each computational unit is driven at a higher clock rate to increase the speed of execution.

Figure 5:
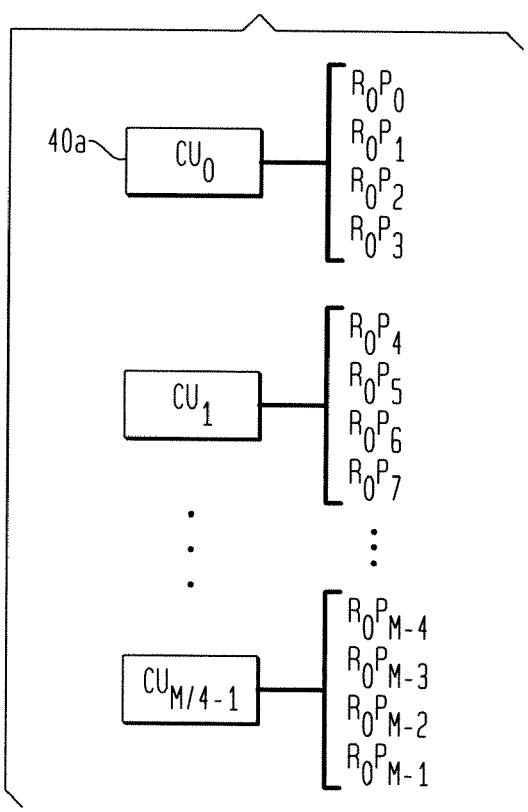
FIG. 5 is a simplified diagram illustrating a third exemplary method for performing correlations in accordance with the present invention.

In another example, as shown in FIG. 5, there are M/4 computational units. In this case, each of the M/4 computational units is driven to perform four (4) correlations within the time period $T_d$; for instance, computational unit 40*a* performs four (4) correlations and generates correlation results $R_0P_0$, $R_0P_1$, $R_0P_2$ and $R_0P_3$. In order to perform four (4) correlations with the time period $T_d$, each computational unit is driven at an even higher clock rate to increase the speed of execution.

FIG. 6 is a block diagram illustrating an exemplary system 100 embodiment in accordance with the present invention. As illustrated, an exemplary system 100, for implementing a system acquisition function to facilitate PN code searching, comprises: a PN sequence generator 110 configured to generate a plurality of PN sequences; and a searcher 10 having a plurality of computational units 20a-20m forming a correlator 130 and configurable to correlate a received signal sample (from receiver 120) with a PN sequence generated by the PN sequence generator, the correlations being executed in a parallel manner. As discussed above, the plurality of PN sequences are generated in a sequential manner; the plurality of PN sequences includes a first PN sequence and a second PN sequence, the second PN sequence immediately following the first PN sequence; and the start of the second PN sequence is determined by shifting the first PN sequence. In addition, a number of computational units from the plurality of computational units are selectively configured to correlate the received signal sample with the PN sequence, with the number of computational units which are selectively configured to correlate the received signal with the PN sequence depending on availability of the plurality of computational units.

FIG. 7 is a flow diagram illustrating a first exemplary method embodiment for implementing a system acquisition function to facilitate the PN code searching in accordance with the present invention. The first exemplary method begins with generating a first PN sequence, the first PN sequence being made up of a plurality of PN chips, step 205, and receiving a first signal sample, step 210. The first signal sample is correlated with the first PN sequence upon receiving the first signal sample, step 215, and a correlation result from the correlation between the first signal sample and the first PN sequence is stored, step 220. A second PN sequence is generated by shifting the first PN sequence and adding an additional PN chip, step 225, and a second signal sample is received, step 230. The second signal sample is correlated with the second PN sequence, step 235, and the methodology accumulates a correlation result from the correlation between the second signal sample and the second PN sequence with the correlation result from the correlation between the first signal sample and the first PN sequence, step 240. The method then repeats the above generating, receiving, correlating and accumulating steps with each received signal and each newly generated PN sequence, step 245.

FIG. 8 is a flow diagram illustrating a second exemplary method embodiment for implementing a system acquisition function to facilitate PN code searching in accordance with the present invention. The second exemplary method begins with maintaining a plurality of configurable computational units, step 305, and receiving a plurality of signal samples, step 310. One or more of the plurality of configurable computational units are configured to implement a PN sequence generator to generate a plurality of PN sequences, step 315. One or more of the plurality of configurable computational units are configured to implement a correlator to correlate the plurality of signal samples with the plurality of PN sequences, step 320. Each one of the plurality of signal samples is correlated with a corresponding one of the plurality of PN sequences at the time when each one of the plurality of signal samples is received, step 325. As discussed above, the number of configurable computational units used to implement the correlator depends on availability of the plurality of configurable computational units. In addition, the method may also provide for generating the plurality of PN sequences in a sequential manner, wherein the plurality of PN sequences includes a first PN sequence and second PN sequence, the second PN sequence immediately following the first PN sequence, and wherein the start of the second PN sequence is determined by shifting the first PN sequence.

Based on the disclosure provided herein, a person of ordinary skill in the art should be able to determine the appropriate number of computational units to be used to implement the PN sequence generation function and the correlation function in accordance with the present invention. The number of computational units which can be used depends on a number of factors, such as the availability of the configurable hardware resources, the incoming signal rate or, conversely, the signal period, and the available clock rates, etc. For instance, if only a limited number of computational units can be used, then the clock rate may need to be driven higher in order to perform the requisite number of correlations. Conversely, if additional hardware resources are available, additional computational units driven at a lower clock rate may be implemented to perform the same number of correlations. For another instance, if the signal period is shortened, then additional computational units may be needed to perform the requisite number of correlations within the signal period.

The present invention as described above can also be used to provide more efficient set maintenance. Signals from the base station which previously transmitted the strongest pilot signal can be searched and correlated more quickly to confirm that this base station continues to be the one transmitting the strongest pilot signal. Likewise, signals from the base stations which correspond to the candidate set and the neighbor set respectively can also be searched and correlated more quickly to update the status of the neighbor set and the neighbor set. A candidate set may be searched more frequently than a neighbor set. As a result, the set maintenance update cycle is reduced.

Moreover, while the above disclosure provided above is described in connection with a searcher 10, it should be understood that the present invention is not restricted to use with a searcher and that the present invention is applicable to and can be used with any communication devices which are capable of performing a system acquisition function.

It is understood that the present invention as described above is applicable to a CDMA communication system but that a person of ordinary skill in the art should know of other ways and/or methods to apply the present invention to other types of communication systems.

Furthermore, it is to be understood that the present invention as described above can be implemented in the form of control logic using software, hardware or a combination of both. Based on the disclosure provided herein, a person of ordinary skill in the art will know of other ways and/or methods to implement the present invention.

It is further understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A communications module for identifying a particular PN code among one or more PN codes embedded in a plurality of received signal samples, the communications module comprising:
 a PN sequence generator configured to generate a plurality of PN sequences corresponding to a plurality of PN codes;
 a plurality of computational units configurable to correlate the plurality of received signal samples with the plurality of PN sequences and further configurable to provide other hardware resources; and
 control logic to selectively configure a number of computational units from the plurality of computational units to correlate the plurality of received signal samples with the plurality of PN sequences to generate correlation results for identifying the particular PN code, the number of computational units depending upon the availability of the plurality of computational units from providing the other hardware resources.

2. The communications module of claim 1, wherein the plurality of received signal samples is received in a sequential manner, the plurality of PN sequences is generated in a sequential order, and the starting positions of any two adjacent PN sequences are offset by a chip.

3. The communications module of claim 2, wherein the start of each successive one of the plurality of PN sequences is determined by shifting an immediately preceding one of the PN sequences.

4. The communications module of claim 3, wherein each successive one of the plurality of PN sequences is generated by shifting an immediately preceding one of the PN sequences and adding an additional chip.

5. The communications module of claim 2, wherein a respective one of the plurality of received signal samples is correlated with a respective one of the plurality of PN sequences as soon as the respective one of the plurality of received signal samples is received.

6. The communications module of claim 5, wherein each one of the plurality of received signal samples is discarded after being correlated with the respective one of the plurality of PN sequences.

7. The communications module of claim 1, wherein each of the plurality of PN sequences has M components, and wherein the number of computational units selectively configured to correlate the plurality of received signal samples with the plurality of PN sequences is M.

8. The communications module of claim 1, wherein the number of computational units which are selectively configured to correlate the plurality of received signal samples with the plurality of PN sequences is capable of being reduced when a clock rate driving the plurality of computational units is increased.

9. The communications module of claim 1, wherein the number of computational units which are selectively configured to correlate the plurality of received signal samples with the plurality of PN sequences is capable of being reduced when the availability of the plurality of computational units is reduced.

10. The communications module of claim 1, wherein the communications module is located in a communications device.

11. The communications module of claim 10, wherein the communications device is a mobile phone for use in a CDMA communication system.

12. A communications device for identifying a particular PN code among one or more PN codes embedded in a plurality of received signal samples, the communications device comprising:
 a receiver configured to receive a plurality of signals;
 a plurality of computational units selectively configurable to implement a correlator to correlate the plurality of signals with a plurality of PN sequences to generate correlation results for identifying the particular PN code, and further configurable to provide other hardware resources, the plurality of PN sequences generated by a PN sequence generator and corresponding to a plurality of PN codes; and
 control logic to selectively configure a number of computational units of the plurality of computation units to implement the correlator, the number of the computational units depending upon availability of the plurality of computational units from providing the other hardware resources.

13. The communications device of claim 12, wherein the plurality of computational units are further selectively configurable to implement a PN sequence generator to generate the plurality of PN sequences.

14. The communications device of claim 13, wherein the control logic is further to selectively configure a subset of the computational units of the plurality of computation units to implement the sequence generator, the subset depending upon availability of the plurality of computational units from providing the other hardware resources.

15. The communications device of claim 13, wherein one or more of the number of computational units are selectively configurable to implement the other hardware resources when not needed to implement the sequence generator or the correlator.

16. The communications device of claim 12, wherein:
 the receiver provides the plurality of signals as a plurality of received signal samples in a sequential manner;
 the plurality of PN sequences is generated in a sequential order; and
 each of the plurality of signal samples is correlated with a respective one of the plurality of PN sequences.

17. The communications device of claim 16, wherein a respective one of the plurality of received signal samples is correlated with a respective one of the plurality of PN sequences as soon as the respective one of the plurality of received signal samples is received.

18. The communications device of claim 12, wherein the plurality of received signal samples is received in a sequential manner, the plurality of PN sequences is generated in a sequential order, and the starting positions of any two adjacent PN sequences are offset by a chip.

19. The communications device of claim 18, wherein the start of each successive one of the plurality of PN sequences is determined by shifting an immediately preceding one of the PN sequences.

20. The communications device of claim 19, wherein each successive one of the plurality of PN sequences is generated by shifting an immediately preceding one of the PN sequences and adding an additional chip.

21. The communications device of claim 12, wherein each one of the plurality of received signal samples is discarded after being correlated with the respective one of the plurality of PN sequences.

22. The communications device of claim 12, wherein each of the plurality of PN sequences has M chips and the number of computational units selectively configured to implement the correlator is M or smaller.

23. The communications device of claim 12, wherein the number of computational units which are selectively configured to implement the correlator is capable of being reduced when a clock rate driving the plurality of computational units is increased.

24. The communications device of claim 12, wherein the number of computational units which are selectively configured to implement the correlator is capable of being reduced when the availability of the plurality of computational units is reduced.

25. The communications device of claim 12, wherein the communications device is a mobile phone for use in a CDMA communication system.

26. A method for implementing a communications function for identifying a particular PN code among one or more PN codes embedded in a plurality of received signal samples, the method comprising:
receiving the plurality of signal samples;
configuring a PN sequence generator to generate a plurality of PN sequences corresponding to a plurality of PN codes;
providing a plurality of computational units configurable to correlate the plurality of received signal samples with the plurality of PN sequences and further configurable to provide other hardware resources; and
selectively configuring a number of computational units from the plurality of computational units to correlate the plurality of received signal samples with the plurality of PN sequences to generate correlation results for identifying the particular PN code, the number of computational units depending upon the availability of the plurality of computational units from providing the other hardware resources.

27. The method of claim 26, wherein:
the plurality of signals is provided as a plurality of received signal samples in a sequential manner;
the plurality of PN sequences is generated in a sequential order; and
the starting positions of any two adjacent PN sequences are offset by a chip.

28. The method of claim 27, further comprising determining the start of each successive one of the plurality of PN sequences by shifting an immediately preceding one of the PN sequences.

29. The method of claim 27, wherein a respective one of the plurality of received signal samples is correlated with a respective one of the plurality of PN sequences as soon as the respective one of the plurality of received signal samples is received.

30. The method of claim 29, further comprising discarding each one of the plurality of received signal samples after being correlated with a respective one of the plurality of PN sequences.

31. The method of claim 26, wherein the correlating comprises correlating each of the plurality of signal samples with the corresponding one of the plurality of PN sequences as soon as the signal sample is received.

32. The method of claim 26, further comprising generating each successive one of the plurality of PN sequences by shifting an immediately preceding one of the PN sequences and adding an additional chip.

33. The method of claim 26, wherein each of the plurality of PN sequences has M chips and the number of computational units selectively configured to correlate the plurality of received signal samples with the plurality of PN sequences is M or smaller.

34. The method of claim 26, further comprising increasing the clock rate driving the plurality of computational units and, once the clock rate is increased, reducing the number of computational units.

35. The method of claim 26, further comprising reducing the number of computational units which are selectively configured to correlate the plurality of received signal samples with the plurality of PN sequences when the availability of the plurality of computational units is reduced.

36. The method of claim 26, selectively configuring one or more of the number of computational units from the plurality of computational units for providing the other hardware resources when not needed for generating the plurality of PN sequences or for correlating the plurality of signals.

37. The method of claim 26, wherein the method is implemented in a communications device.

38. The method of claim 37, wherein the communications device is a mobile phone for use in a CDMA communication system.

* * * * *